US011912732B2

(12) United States Patent
Wiesner et al.

(10) Patent No.: US 11,912,732 B2
(45) Date of Patent: Feb. 27, 2024

(54) METHOD FOR CLEAVING ALKYL TIN HALIDES

(71) Applicant: BNT Chemicals GmbH, Bitterfeld-Wolfen (DE)

(72) Inventors: Sebastian Wiesner, Leipzig (DE); Horst Luthard, OT-Sandersdorf (DE); Marcus Watts, Sandersdorf (DE); Vincent Perl, Magdeburg (DE)

(73) Assignee: BNT CHEMICALS GMBH, Bitterfeld-Wolfen (DE)

( * ) Notice: Subject to any disclaimer, the term of this patent is extended or adjusted under 35 U.S.C. 154(b) by 0 days.

(21) Appl. No.: 17/719,036

(22) Filed: Apr. 12, 2022

(65) Prior Publication Data

US 2022/0332735 A1 Oct. 20, 2022

Related U.S. Application Data

(60) Provisional application No. 63/197,753, filed on Jun. 7, 2021.

(30) Foreign Application Priority Data

Apr. 13, 2021 (EP) .................................. 21168054

(51) Int. Cl.
*C07F 7/22* (2006.01)
(52) U.S. Cl.
CPC .................................. *C07F 7/2208* (2013.01)
(58) Field of Classification Search
CPC .................................................. C07F 7/2208
See application file for complete search history.

(56) References Cited

U.S. PATENT DOCUMENTS

| | | | | |
|---|---|---|---|---|
| 2,599,557 A * | 6/1952 | Johnson | C07F 7/2208 | 556/97 |
| 3,248,411 A * | 4/1966 | Burkhardt | C07F 7/2208 | 556/97 |
| 3,297,732 A * | 1/1967 | Banks | C07F 7/2208 | 556/97 |
| 3,347,888 A * | 10/1967 | Seyferth | C07F 7/22 | 556/89 |
| 3,415,857 A * | 12/1968 | Hoye | C07F 7/2208 | 556/88 |
| 3,417,116 A * | 12/1968 | Considine | C07F 7/2204 | 556/97 |
| 3,454,610 A * | 7/1969 | Langer | C07F 7/00 | 556/97 |
| 3,459,779 A * | 8/1969 | Paul | C07F 7/2208 | 556/97 |
| 3,595,892 A * | 7/1971 | Van Den Hurk | C07F 7/2208 | 556/97 |
| 3,607,893 A * | 9/1971 | Reifenberg | C07F 7/2208 | 556/104 |
| 3,824,264 A * | 7/1974 | Bulten | C07F 7/2208 | 556/89 |
| 3,862,198 A * | 1/1975 | Kugele | C07F 7/2208 | 556/97 |
| 3,894,066 A * | 7/1975 | Buschhoff | C07F 7/2208 | 556/102 |
| 4,148,814 A * | 4/1979 | Reifenberg | C07F 7/2208 | 556/97 |
| 4,604,475 A * | 8/1986 | Buschhoff | C07F 7/2208 | 556/97 |
| 4,835,296 A * | 5/1989 | Shah | C07F 7/2208 | 556/97 |
| 5,886,210 A * | 3/1999 | Rayle | C07C 45/65 | 560/103 |
| 6,768,017 B2 | 7/2004 | Thoonen et al. | | |
| 7,552,472 B2 | 9/2009 | Boele et al. | | |
| 7,592,472 B2 * | 9/2009 | Boele | C07F 7/2208 | 556/103 |
| 8,633,330 B2 * | 1/2014 | Merz, III | C07F 7/2208 | 556/97 |
| 10,174,060 B2 * | 1/2019 | Pieper | C07F 7/2296 | |
| 2004/0077891 A1 * | 4/2004 | Thoonen | C07F 7/2208 | 556/87 |
| 2007/0185090 A1 * | 8/2007 | Busch-Petersen | C07D 417/12 | 514/217.02 |
| 2009/0131704 A1 * | 5/2009 | Boele | C07F 7/2208 | 556/103 |
| 2011/0065962 A1 * | 3/2011 | Meneguzzo | C07C 45/36 | 568/323 |
| 2017/0334935 A1 * | 11/2017 | Pieper | C07F 7/2208 | |

FOREIGN PATENT DOCUMENTS

| | | |
|---|---|---|
| CN | 109824716 A * | 5/2019 |
| CN | 109824716 A | 5/2019 |

(Continued)

OTHER PUBLICATIONS

J. March, Advanced Organic Chemistry Reactions, Mechanisms and Structure 248-272 (4th ed., 1992) (Year: 1992).*
Hawley's Condensed Chemical Dictionary, p. 828 (16th ed., 2016, R.J. Larrañaga ed.) (Year: 2016).*
IUPAC. Compendium of Chemical Terminology, Gold Book, Version 2.3.2, pp. 60 and 369 (2012) (Year: 2012).*
J. Leonard et al., Advanced Practical Organic Chemistry 177-226 (2nd ed., 1995) (Year: 1995).*
A. Whyte et al., Inorganic Chemistry, 12867-12876 (2011) (Year: 2011).*
European Search Report for European Application No. 21168054.1 dated Sep. 2, 2021.

*Primary Examiner* — Alexander R Pagano

(74) *Attorney, Agent, or Firm* — Muncy, Geissler, Olds & Lowe, P.C.

(57) ABSTRACT

A method of producing a mono alkyl tin halide from a poly alkyl tin halide, comprising providing the poly alkyl tin halide, adding a Lewis acid catalyst to the poly alkyl tin halide to create a reaction mixture, heating the reaction mixture, dosing a hydrogen halide into the reaction mixture to convert the poly alkyl tin halide into a raw product containing mono alkyl tin halide.

17 Claims, No Drawings

(56) References Cited

FOREIGN PATENT DOCUMENTS

| EP | 1 225 177 A1 | 7/2002 | |
|----|----|----|----|
| EP | 1 743 898 A1 | 1/2007 | |
| EP | 3 184 532 A1 | 6/2017 | |
| NL | 6700012 A * | 1/1967 | ............ C07F 7/2204 |
| WO | WO-2012003415 A1 * | 1/2012 | ............ C07F 7/2216 |

* cited by examiner

METHOD FOR CLEAVING ALKYL TIN HALIDES

This nonprovisional application claims priority to European Patent No. 21 168 054.1, which was filed on Apr. 13, 2021 and to U.S. Provisional Application No. 63/197,753, which was filed on Jun. 7, 2021, and which are both herein incorporated by reference.

BACKGROUND OF THE INVENTION

Field of the Invention

The present invention relates to a method of producing mono alkyl tin trihalides, particularly involving a cleavage reaction.

Description of the Background Art

Mono alkyl tin halides are technically important as precursors for the manufacture of catalysts and stabilizers. Furthermore, mono alkyl tin halides are employed in hardening glass containers using a CVD procedure and for the preparation of catalysts and stabilizers. The manufacture of mono alkyl tin halides is usually performed in industrial scale by redistribution reactions utilizing the reaction of higher alkylated tin species with tin tetra halides.

  (1)

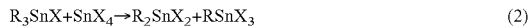  (2)

  (3)

  (4)

R=Alkyl, Aryl
X=Cl/Br/I

The outcome of the redistribution "Kocheshkov" reaction is widely affected by the nature and number of alkyl groups attached to the alkylating partner. Whereas redistribution reactions involving tetra alkylated species proceed swiftly under mild conditions utilizing tri- and dialkylated species show the need for harsher conditions. Reactions according to equation (1) proceed slightly exothermic at ambient temperatures whereas reactions (2) and (3) only proceed at high temperatures up to 200° C. For the dialkylated species redistribution reactions according to equation (4) are reported for vinyl/phenyl only but the technically important methyl/butyl/octyl species do not undergo this transformation.

Therefore, the industrial manufacture of tri/di/mono substituted alkyl tin species is governed by equations (1) (2) (3) indicating that the formation of monosubstituted alkyl tin is usually linked to the formation of disubstituted alkyl tin halide.

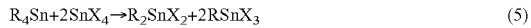  (5)

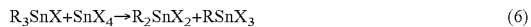  (6)

R=Alkyl, Aryl
X=Cl/Br/I

The portion of formed disubstituted species relates to the nature of alkylating agent as shown in equations (5) (6) but is practically 40 . . . 60% by weight. In industrial practice the mono- and disubstituted species are separated by column rectification. Depending on market conditions the formation of byproducts in the above-mentioned ratio can be a major drawback.

It is known that numerous attempts are reported to increase the yield of monosubstituted product as in many cases these are the preferred species.

The document U.S. Pat. No. 3,862,198 involves quaternary ammonium salts as catalysts for the preparation of mono alkyl tin halides from di alkyl tin halides in redistribution reactions with tin tetrahalide. The reported procedure shows good yields on methyl species but lack activity for the technically important long chain alkyls.

Neumann et. al. disclose in U.S. Pat. No. 3,459,779 a redistribution of dialkyltin halides with tin tetrahalide in the presence of phosphorous oxide and—oxychlorides to mono alkyl tin halides. Although the reported yields are remarkable for ethyl/butyl/octyl tin halides, the reaction conditions remain harsh and the reaction temperatures long.

DOW Chemical report in U.S. Pat. No. 3,454,610 the use of alkylsulfoxides as solvent in order to promote redistributions from dialkyl tin halides to mono alkyl tin halides. However, the reaction is reported only for methyl and phenyl tin halides and the separation of the product from sulfoxide seems too laborious.

In U.S. Pat. No. 3,824,264 Cosan Chemicals reveals a direct conversion of tin metal and alkyl halides in mono alkyl halides in the presences of organo antimony catalysts. For useful reaction rates this synthetic route is limited to bromide derivatives whereas the technically important chloride species show very slow reaction rates.

Schering AG discloses in U.S. Pat. No. 4,604,475 an enhanced redistribution reaction of technically important butyl-/octyl tin chlorides and tin tetrachloride in the presence of tin fluoride as catalyst. Hereby the manufacture of tri- and dialkyl species is thoroughly described whereas the enhancement of the formation of mono alkyl tin chlorides remains unproved.

EP 1225177A1 (which corresponds to US 2004/0077891) and EP 3184532 A1 reveals redistribution of methyl-, butyl- and hexyl tin chlorides with tin tetrachloride into mono alkyl tin trichlorides utilizing and transition metal catalyst. These catalysts are composed of at least one metal from group VIII and phosphane ligands, the reaction is conducted in homogenous phase. The document EP 1743898 (which corresponds to US 2009/0131704) discloses a conversion of stannous chloride or tin metal and alkenes into mono alkyl and di alkyl tin chlorides utilizing catalysts which are composed of at least one metal from group VIII and phosphane ligands. Despite excellent yields and selectivity, the use of catalysts in homogenous phase is disadvantageous for reusing the used noble metals and renders both approaches economically inefficient.

Due to the chemical and monetary drawbacks of all above mentioned methods a need arises for a simple and effective procedure to convert alkyl tin compounds, e.g. poly alkyl tin halides, preferably di alkyl tin halides, into mono alkyl tin halides.

SUMMARY OF THE INVENTION

It is therefore an object of the present invention to provide an improved process for the manufacture of mono alkyl tin trihalides involving a catalyzed redistribution ensued by a cleavage reaction employing hydrogen halide in the presence of a Lewis acid catalyst.

According to the invention, a method of producing a mono alkyl tin halide from an alkyl tin compound comprises: providing the alkyl tin compound, adding a Lewis acid catalyst to the alkyl tin compound to create a reaction mixture, heating the reaction mixture, dosing a hydrogen halide into the reaction mixture to convert the alkyl tin compound into a raw product containing mono alkyl tin halide.

In an exemplary embodiment, the Lewis catalyst comprises a covalent metal halide and a Lewis active metal center.

In an exemplary embodiment, the covalent metal halide comprises at least one of Fluorine, Chlorine, Bromine and Iodine.

In an exemplary embodiment, the Lewis active metal center is one of tin, titanium, aluminum, iron, boron, bismuth, silicon, and phosphor.

In an exemplary embodiment, the Lewis catalyst used is aluminum chloride ($AlCl_3$).

In an exemplary embodiment, the Lewis catalyst is being used in an amount between 0.1 weight % and 10 weight %, for example between 2 weight % and 6 weight %, based on the alkyl tin compound.

In an exemplary embodiment, an aprotic or inert solvent is added to the reaction mixture, wherein the solvent is in particular at least one of an alkane, an aromatic, a halogenated aromatic, in particular n-octane, toluene, o-xylene or 1,2-dichlorbenzene.

In an exemplary embodiment, the reaction mixture is heated to a temperature in a range from 100° C. to 160° C., for example 115° C. to 145° C., in particular 135° C. 140° C.

In an exemplary embodiment, the hydrogen halide used is hydrogen chloride (HCl).

In an exemplary embodiment, the hydrogen halide used is gasiform.

In an exemplary embodiment, the hydrogen halide is used neat anhydrous.

In an exemplary embodiment, the hydrogen halide is fed into the reaction mixture over a period of 1 hour to 20 hours, for example over a period of 3 hours to 10 hours, in particular over a period of 4 hours to 8 hours.

In an exemplary embodiment, the alkyl tin compound is at least one of a poly alkyl tin halide and a tetra alkyl tin.

In an exemplary embodiment, the alkyl tin compound is dealkylated into mono alkyl halides according to one of the equations:

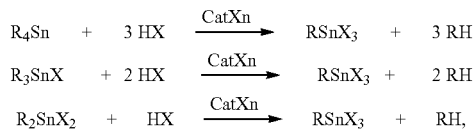

wherein R is an Alkyl or Cycloalkyl, X is one of Chlorine, Bromine and Iodine and $CatX_n$ is the Lewis acid catalyst.

In an exemplary embodiment, the alkyl tin compound is reacted with tin tetra halide and the resulting mixture is dealkylated into mono alkyl halides according to one of the equations:

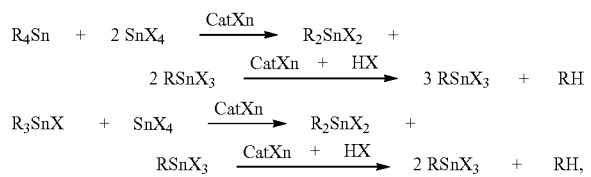

wherein R is an Alkyl or Cylcoalkyl, X is one of Chlorine, Bromine and Iodine and $CatX_n$ is the Lewis acid catalyst.

In an exemplary embodiment, the mono alkyl tin halide monobutyltintrichloride ($MTBTCl_3$) is produced from the poly alkyl tin halide dibutyltindichlorid ($DBTCl_2$) or from Tributyltinchloride or from Tetrabutyltin.

Surprisingly a method for producing selectively mono alkyl tri halides utilizing poly alkyl tin halides was found. This method involves a solventless procedure by catalytic dealkylation of poly alkyl tin halides at moderate temperatures with hydrogen halide in the presence of a catalyst.

In an exemplary embodiment, the method combines catalytic redistribution reactions of poly alkyl tin halides or tetra alkyl tin with tin tetra halides enhanced by Lewis acid catalysts and subsequent dealkylation of the resulting mixture of mono and di alkyl tin halides into pure mono alkyl tin halides.

DETAILED DESCRIPTION OF THE INVENTION

The present invention relates to a way for producing mono alkyl tin halides from alkyl tin compounds, e.g. poly alkyl tin halides. For this purpose, a cleavage reaction according to formula (7) is employed.

$$R_2SnX_2 + HX \rightarrow RSnX_3 + RH \quad (7)$$

R=Alkyl, Cylcoalkyl
X=Cl/Br/I

This process is enabled by utilizing a Lewis acid catalyst and leads to a reaction mechanism shown in formula (8). Without catalyst no reaction occurs.

$$R_2SnX_2 + CatX_n \rightarrow RSnX_3 + RCatX_{n-1} \quad (8)$$

$$RCatX_{n-1} + HX \rightarrow CatX_n + RH \quad (9)$$

R=Alkyl, Cylcoalkyl
X=Cl/Br/I
$CatX_n$=catalyst

The catalyst for this reaction is chosen from the known Lewis acid catalyst series. The catalyst comprises covalent metal halides taking the halides F/Cl/Br/I and Lewis active metal centers into account, for example Sn/Ti/Al/Fe/B/Bi/Si/P, in particular Sn and Al. The amount of catalyst being used may be between 0.1 weight % and 10 weight % based on the alkyl tin compound, e.g. the poly alkyl tin halide or tetra alkyl tin, in particular between 2 weight % and 6% weight %.

The reaction may be conducted with or without the use of a solvent, wherein an aprotic or inert organic solvent may be preferred. This includes alkanes, aromatics and halogenated aromatics, for example n-octane, toluene, o-xylene, 1,2-dichlorbenzene.

The conversion is done at elevated temperatures in a range from 60° C. to 220° C., for example 100° C. to 150° C., in particular 125° C. to 140° C.

The hydrogen halides employed in this reaction are used neat anhydrous and are fed into the reaction mixture within a time period of 1 h to 20 h, for example within 3 h to 10 h, in particular 4 h to 8 h.

The alkyl tin compounds, e.g. poly alkyl tin halides or tetra alkyl tin, utilized as raw materials can be dealkylated into mono alkyl halides according to equations (10)(11)(12), the conversion of di alkyl tin halides into mono alkyl tin halides according to equation (12) is the preferred reaction.

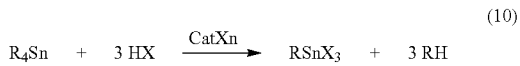
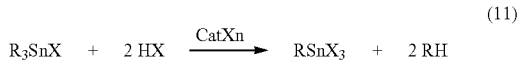
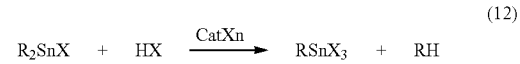

R = Alkyl, Cylcoalkyl
X = Cl/Br/I
$CatX_n$ = catalyst

An exemplary embodiment is the use of mono- and dialkyl tin halide mixtures as resulting from catalyzed redistribution procedures. For that purpose, alkyl tin compounds, e.g. poly alkyl tin halides or tetra alkyl tin, are reacted with tin tetra halide into corresponding mixtures and subsequently dealkylated using the same Lewis acid catalyst as shown in equation (13) (14). This operation may be conducted in the same reaction vessel. It has been shown that the use of Lewis acid catalyst significantly enhances the speed of the redistribution reaction.

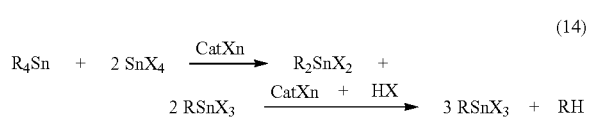

R = Alkyl, Cylcoalkyl
X = Cl/Br/I
$CatX_n$ = catalyst

Resulting alkane cleavage products are formed in liquid or gaseous state in the reaction mixture. The purification of the mono alkyl tin halides is conducted by state-of-the-art distillation resulting in up to 90% yield based on used alkyl tin compounds, e.g. poly alkyl halides or tetra alkyl tin.

Reductive elimination (15) (16) was seen to form <10% stannous halides.

R = Alkyl, Cylcoalkyl
X = Cl/Br/I
$CatX_n$ = catalyst

EXAMPLES

Preparation of Monobutyltintrichloride from Dibutyltindichloride

In a round bottomed flask 300 g Dibutyltindichloride technical grade (GC derivative with EtMgBr showed 95.0% purity) 0.98 mol was mixed with 9.0 g anhydrous Aluminium chloride 0.067 mol and heated under nitrogen atmosphere to 130° C. to 140° C. A stream of thoroughly dried hydrogen chloride was inserted with approximately 6 l/h while maintaining the temperature of the mixture. Effluent gas was neutralized and alkanes trapped in a cold trap. After 6 h the conversion was completed as seen in a GC measurement (EtMgBr MBTC 99.5%). The resulting mixture was distilled at 7 mbar to yield 270 g colorless MBTC b.p. 88° C. (GC content EtMgBr>99.5 and 30 g dark residue (tin 23.8%; aluminium 8.47%; chloride 24.8%).

Preparation of Monobutyltintrichloride from Tributyltinchloride

In a round bottomed flask 170 g Tributyltin chloride technical grade (GC derivative EtMgBr showed TBTC 94.47%) was mixed with 9.0 g anhydrous Aluminium chloride and heated under nitrogen atmosphere to 50° C. In the course of 2 h 130.0 g tin tetrachloride was added dropwise, the temperature was than raised within 60 min to 130° C. to 140° C. The GC sample showed complete conversion into DBTC and MBTC. Then a stream of thoroughly dried hydrogen chloride was inserted with approximately 6 l/h while maintaining the temperature of the mixture. Effluent gas was neutralized and alkanes trapped in a cold trap. After 6 h the conversion was completed as seen in a GC measurement (EtMgBr MBTC 99.5%). The resulting mixture was distilled at 7 mbar to yield 264 g colorless MBTC b.p. 88° C. and 34 g dark residue (tin 23.8%; aluminium 8.47%; chloride 24.8%).

Preparation of Monobutyltintrichloride from Tetrabutyltin

In a round bottomed flask 120 g Tetrabutyltin technical grade (GC derivative EtMgBr showed TBT 73.31% and TBTC 25.32%) was mixed with 8.3 g anhydrous Aluminium chloride and heated under nitrogen atmosphere to 50° C. In the course of 2 h 156.3 g tin tetrachloride was added dropwise, the temperature was than raised within 60 min to 130° C. to 140° C. The GC sample showed complete conversion into DBTC and MBTC. Then a stream of thoroughly dried hydrogen chloride was inserted with approximately 6 l/h while maintaining the temperature of the mixture. Effluent gas was neutralized and alkanes trapped in a cold trap. After 6 h the conversion was completed as seen in a GC measurement (EtMgBr MBTC 99.5%). The resulting mixture was distilled at 7 mbar to yield 248 g colorless MBTC b.p. 88° C. and 27.9 g dark residue (tin 23.8%; aluminium 8.47%; chloride 24.8%).

Likewise, the method may be used to prepare Monomethyltintrichloride from Dimethyltindichloride or Monooctyltintrichloride from Dioctyltindichloride.

What is claimed is:

1. A method of producing a mono alkyl tin halide from an alkyl tin compound, the method comprising:
   providing the alkyl tin compound;
   adding a Lewis acid catalyst to the alkyl tin compound to create a reaction mixture;
   heating the reaction mixture; and
   dosing a hydrogen halide into the reaction mixture to convert the alkyl tin compound into a raw product containing mono alkyl tin halide,
   wherein the hydrogen halide used is gasiform.

2. The method according to claim 1, wherein the Lewis catalyst comprises a covalent metal halide and a Lewis active metal center.

3. The method according to claim 2, wherein the covalent metal halide comprises at least one of Fluorine, Chlorine, Bromine and Iodine.

4. The method according to claim 2, wherein the Lewis active metal center is one of tin, titanium, aluminum, iron, boron, bismuth, silicon, and phosphor.

5. The method according to claim 1, wherein the Lewis catalyst used is aluminum chloride ($AlCl_3$).

6. The method according to claim 1, wherein the Lewis catalyst is being used in an amount between 0.1 weight % and 10 weight % based on the alkyl tin compound.

7. The method according to claim 6, wherein the Lewis catalyst is being used in an amount between 2 weight % and 6 weight %.

8. The method according to claim 1, wherein an aprotic or inert solvent is added to the reaction mixture.

9. The method according to claim 8, wherein the solvent is at least one of an alkane, an aromatic, a halogenated aromatic, n-octane, toluene, o-xylene and 1,2-dichlorbenzene.

10. The method according to claim 1, wherein the reaction mixture is heated to a temperature in one of the ranges: from 100° C. to 160° C., from 115° C. to 145° C., and from 135° C. to 140° C.

11. The method according to claim 1, wherein the hydrogen halide used is hydrogen chloride (HCl).

12. A method of producing a mono alkyl tin halide from an alkyl tin compound, the method comprising:
providing the alkyl tin compound;
adding a Lewis acid catalyst to the alkyl tin compound to create a reaction mixture;
heating the reaction mixture; and
dosing a hydrogen halide into the reaction mixture to convert the alkyl tin compound into a raw product containing mono alkyl tin halide,
wherein the hydrogen halide is used neat anhydrous.

13. The method according to claim 1, wherein the hydrogen halide is fed into the reaction mixture over one of the following periods: 1 hour to 20 hours, 3 hours to 10 hours, and 4 hours to 8 hours.

14. The method according to claim 1, wherein the alkyl tin compound is at least one of a poly alkyl tin halide and a tetra alkyl tin.

15. A method of producing a mono alkyl tin halide from an alkyl tin compound, the method comprising:
providing the alkyl tin compound;
adding a Lewis acid catalyst to the alkyl tin compound to create a reaction mixture;
heating the reaction mixture; and
dosing a hydrogen halide into the reaction mixture to convert the alkyl tin compound into a raw product containing mono alkyl tin halide,
wherein the alkyl tin compound is dealkylated into mono alkyl halides according to one of the equations:

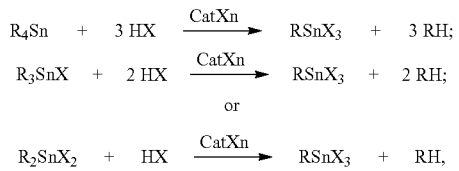

wherein R is an Alkyl, X is one of Chlorine, Bromine and Iodine and $CatX_n$ is the Lewis acid catalyst.

16. A method of producing a mono alkyl tin halide from an alkyl tin compound, the method comprising:
providing the alkyl tin compound;
adding a Lewis acid catalyst to the alkyl tin compound to create a reaction mixture;
heating the reaction mixture; and
dosing a hydrogen halide into the reaction mixture to convert the alkyl tin compound into a raw product containing mono alkyl tin halide,
wherein the alkyl tin compound is reacted with tin tetra halide and the resulting mixture is dealkylated into mono alkyl halides according to one of the equations:

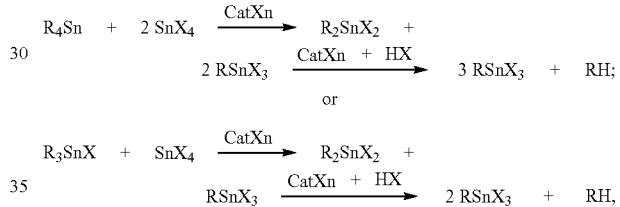

wherein R is an Alkyl, X is one of Chlorine, Bromine and Iodine and $CatX_n$ is the Lewis acid catalyst.

17. The method according to claim 14, wherein the mono alkyl tin halide monobutyltintrichloride ($MTBTCl_3$) is produced from one of dibutyltindichlorid ($DBTCl_2$), tributyltinchloride, and tetrabutyltin.

* * * * *